June 24, 1941.  K. A. HARMON  2,246,587
DYNAMOELECTRIC MACHINE
Filed May 14, 1940      4 Sheets-Sheet 1

INVENTOR
KENNETH A. HARMON
BY Chapin & Neal
ATTORNEYS

INVENTOR
KENNETH A. HARMON
BY Chapin & Neal
ATTORNEYS

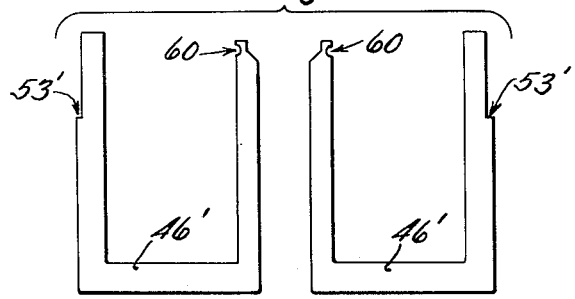
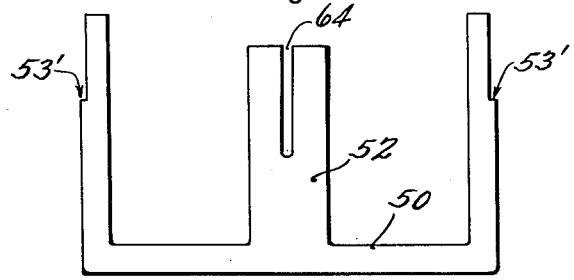
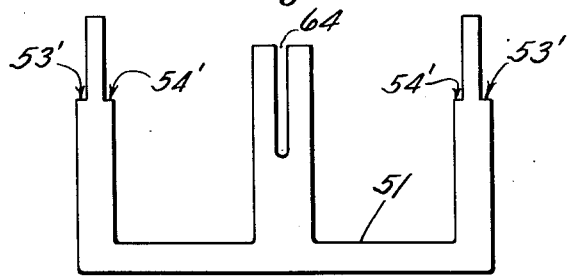
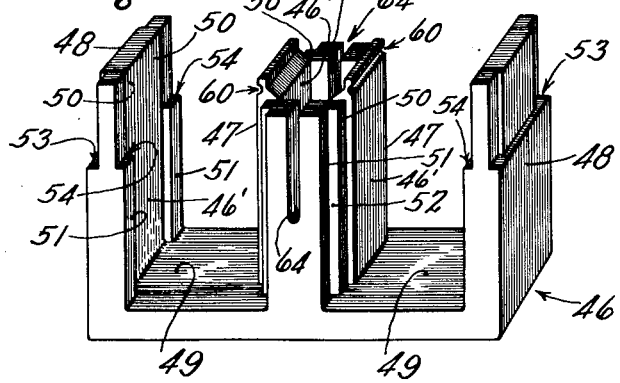
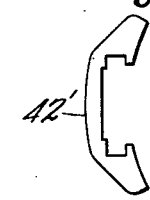

Patented June 24, 1941

2,246,587

UNITED STATES PATENT OFFICE 2,246,587

DYNAMOELECTRIC MACHINE

Kenneth A. Harmon, Longmeadow, Mass., assignor to Wico Electric Company, West Springfield, Mass., a corporation of Massachusetts Application May 14, 1940, Serial No. 335,025

7 Claims. (Cl. 171—209)

This invention relates to improvements in dynamoelectric machines, whether of the generator or motor type. The improvements relate particularly to the armature structure and, more especially, to the construction and mounting of the magnetic flux-conducting members thereof.

The armature structure, with which this invention is concerned, is of that type which includes a generating coil and flux-conducting means extending from one end of such coil axially through the same to the other end thereof, thence radially outward and thence in a direction parallel to the axis of the coil but outside the same to the first-named end thereof. Flux is directed alternately in opposite directions through said means by a rotor, which cooperates with the terminals of said means, all of which terminals are located near the first-named end of the coil. The rotor is usually, although not necessarily, of the permanent magnet type.

The flux-conducting arrangement described is a desirable one for magnetos of the so-called "timer" type, which are adapted to be mounted in place of the timer-distributer unit of an automobile for example, and for other magnetos or other kinds of dynamoelectric machines, where an exceptionally compact arrangement of parts is required.

One example of the type of magneto, referred to, will be found in my co-pending application Serial No. 253,025, filed January 26, 1939.

One of the chief difficulties presented by this type of machine is that of providing a flux-conducting structure which has satisfactory magnetic characteristics and which can be manufactured at a reasonable cost. The structure involves outer pole pieces, which can readily be anchored to the marginal wall of the non-magnetic housing, and inner pole pieces which are carried on the free end of a core. The opposite end only of the core can be anchored and such end is remote from the pole pieces. The inner pole pieces are thus supported in cantilever fashion, but, nevertheless, they must be maintained, within narrow limits, in coaxial relation with the outer pole pieces despite the powerful pull of the magnetic rotor exerted upon them.

This invention has for an object to provide a flux-conducting structure having approximately the shape of an inverted W with a pair of outer legs, carrying at their lower ends suitable pole pieces, and a cross bar connecting their upper ends, and a core extending downwardly from the mid-point of the cross bar and carrying on its lower end pole pieces,—all said pole pieces having curved surfaces which are coaxial with the axis of the core. The components of this structure are rigidly held together as one unit, whereby by securing the outer legs to the marginal wall of the housing and preferably also securing the cross bar to an end wall of the housing, the core may be firmly held and braced to retain its desired coaxial location.

The invention has for another object to provide a flux-conducting structure of the type above described which is made up of laminations and includes two diametrically-opposed laminated members of inverted U-form and two groups of laminations of inverted W-shape. The two groups of W-shaped laminations are applied one on each of two opposite sides of the two groups of U-shaped laminations and serve to rigidly unite them. In particular, they serve to tie together the two inner legs of the two U-shaped members and form with them a composite box-like core. This core, although made up of more or less flexible laminations, is by virtue of its construction made substantially rigid. All parts of the core have integral extensions located in the cross bar portion and are thus firmly supported from portions of the laminated structure which can be securely anchored in the walls of the non-magnetic housing.

These and other objects will best be understood as the detailed description proceeds and they will be pointed out in the appended claims.

The invention will be disclosed with reference to the accompanying drawings, in which—

Figs. 5, 6 and 7 are elevational views showing several kinds of laminations used in making up the flux-conducting part of the armature;

Fig. 8 is a perspective view of the last-named part, complete except for its pole pieces;

Fig. 9 is a plan view of one of the laminations of one of the pole pieces; and

Figure 3:
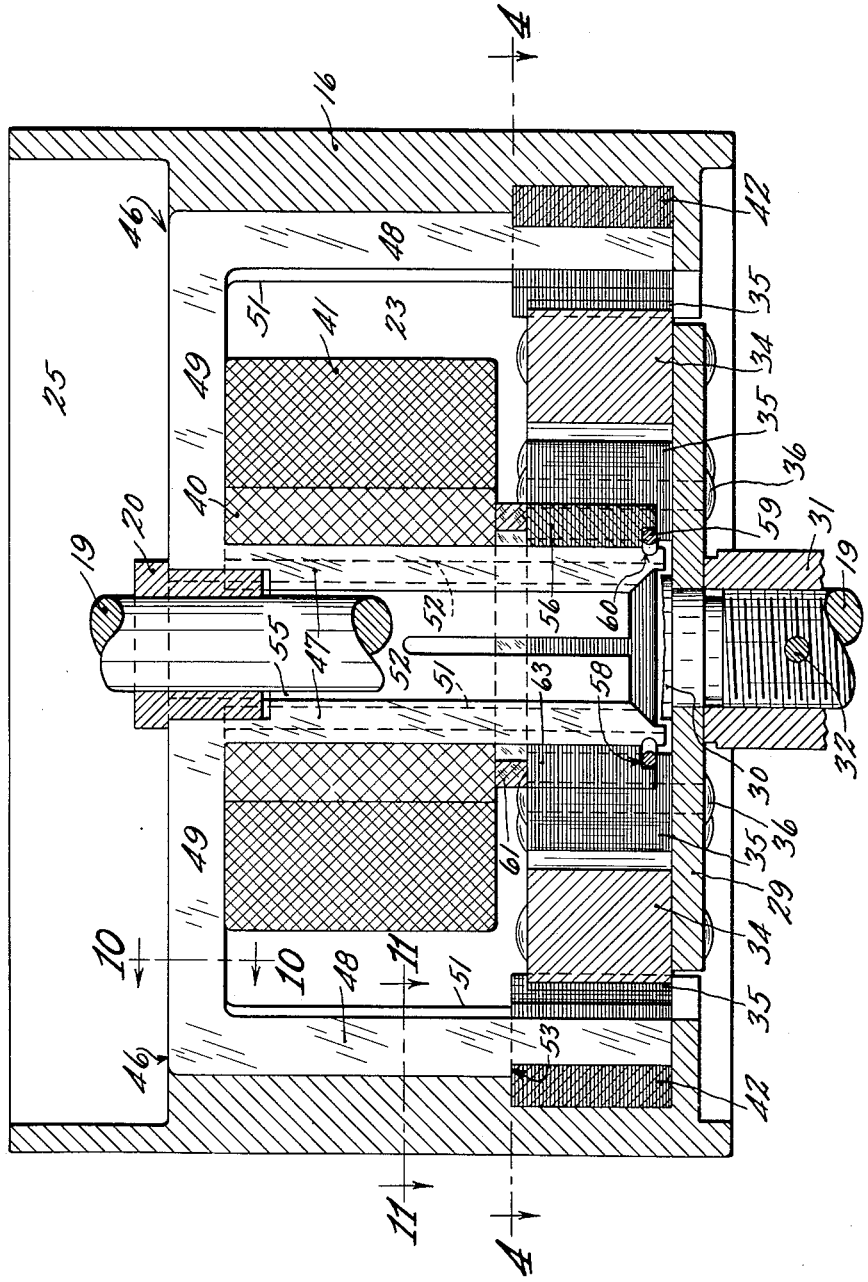
Fig. 3 is an enlarged fragmentary sectional elevational view taken on the line 3—3 of Fig. 2 and showing the armature and field elements of the magneto.
Figure 10:
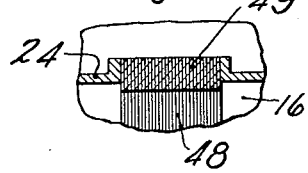
Figure 11:
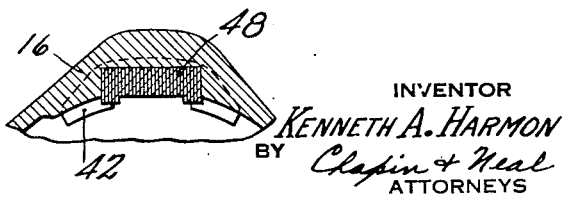

Figs. 10 and 11 are fragmentary cross-sectional views taken on the lines 10—10 and 11—11, respectively, of Fig. 3.

In these drawings, the invention has been shown in connection with a magneto of the magnetic-rotor type as an illustrative example of one kind of dynamoelectric machine in which the invention may be used to advantage. The invention, however, is capable of use in other forms of dynamoelectric machines and is not limited to the one specific type herein disclosed.

Figure 1:
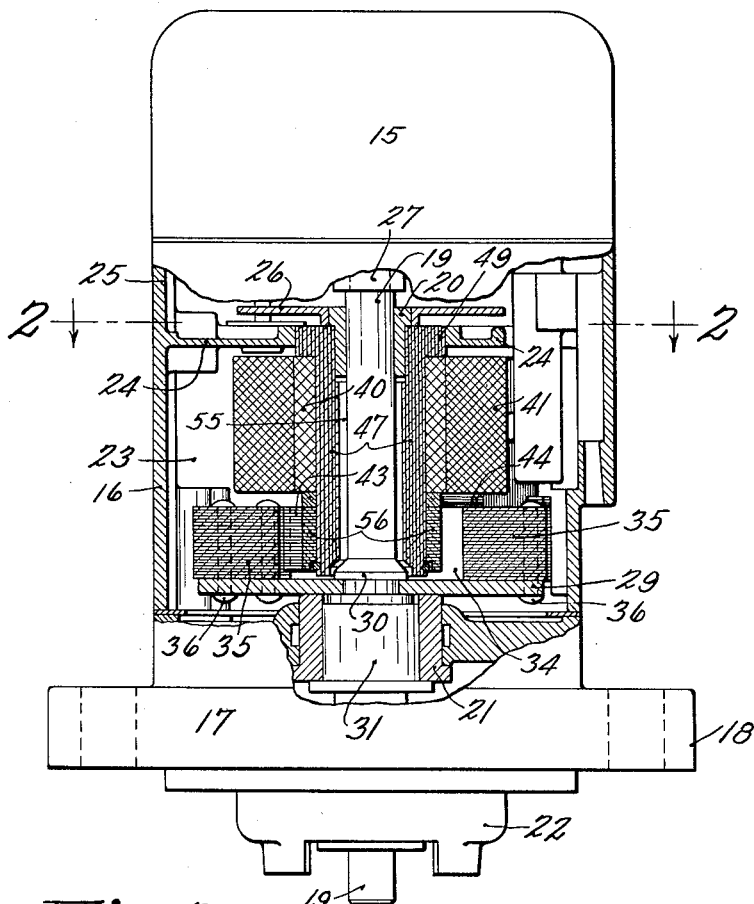
Fig. 1 is an exterior elevational view, partly in section taken on the line 1—1 of Fig. 2, of a magneto embodying the invention.
Figure 2:
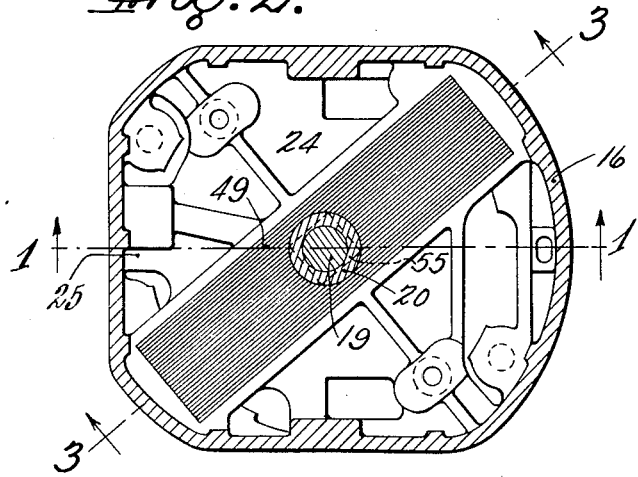
Fig. 2 is a sectional plan view taken on the line 2—2 of Fig. 1.

In Fig. 1, the complete magneto has been shown full size in exterior elevation with parts broken away to reveal the interior parts which have to do with the magnetic structure. The magneto includes a suitable housing, herein shown as made up of upper, intermediate and lower sections 15, 16 and 17, respectively. The housing is supported from the engine, which drives the magneto, in any suitable way and in this case, the lower section is provided with a flange 18 adapted to be bolted to the engine crankcase. The magneto drive shaft 19 is rotatably mounted in upper and lower bearings 20 and 21, respectively, fixed in the intermediate and lower sections, respectively. The lower end of shaft 19 carries a coupling 22 adapted for driving engagement with a suitable engine-driven member in the engine crankcase. The coupling 22 may be of any suitable type, such as an impulse coupling as herein indicated.

The intermediate section 16 affords a chamber 23, closed at its upper end by a horizontal partition 24, formed as an integral part of section 16, and closed at its lower end by the lower section 17. In section 16, above partition 24, is a compartment 25 in which is housed suitable breaker-point mechanism. Such mechanism is mounted on a fixed plate 26 and actuated by a cam fixed on shaft 19,—a portion of the cam being shown at 27. Within the upper casing 15, which surmounts and closes the upper end of section 16, is a suitable distributer. The distributer and breaker point mechanism may be of any suitable form and a detailed description of them is deemed unnecessary to an understanding of the present invention,—reference being made to the above identified application for a more complete disclosure if such is necessary. The several sections 15, 16 and 17 are fastened together in any suitable manner as for example as disclosed in said application. The section 16 and preferably also the section 17 are made of non-magnetic material. In this particular case, these sections are made of metal and the section 16 may be a die-casting.

The shaft 19 carries the rotor of the magneto which rotor is fixed to the shaft in any suitable way, for example as shown in Fig. 3. The rotor has a supporting disc 29 of non-magnetic material, which is clamped against a flange 30 on shaft 19 by means of a cylindrical nut 31, which is threaded on the shaft. After the nut has been screwed up tight, a pin 32 may be driven through the nut and shaft to fix the nut in place. The exterior of the nut is ground to rotatably fit the lower bearing 21 (Fig. 1).

Figure 4:
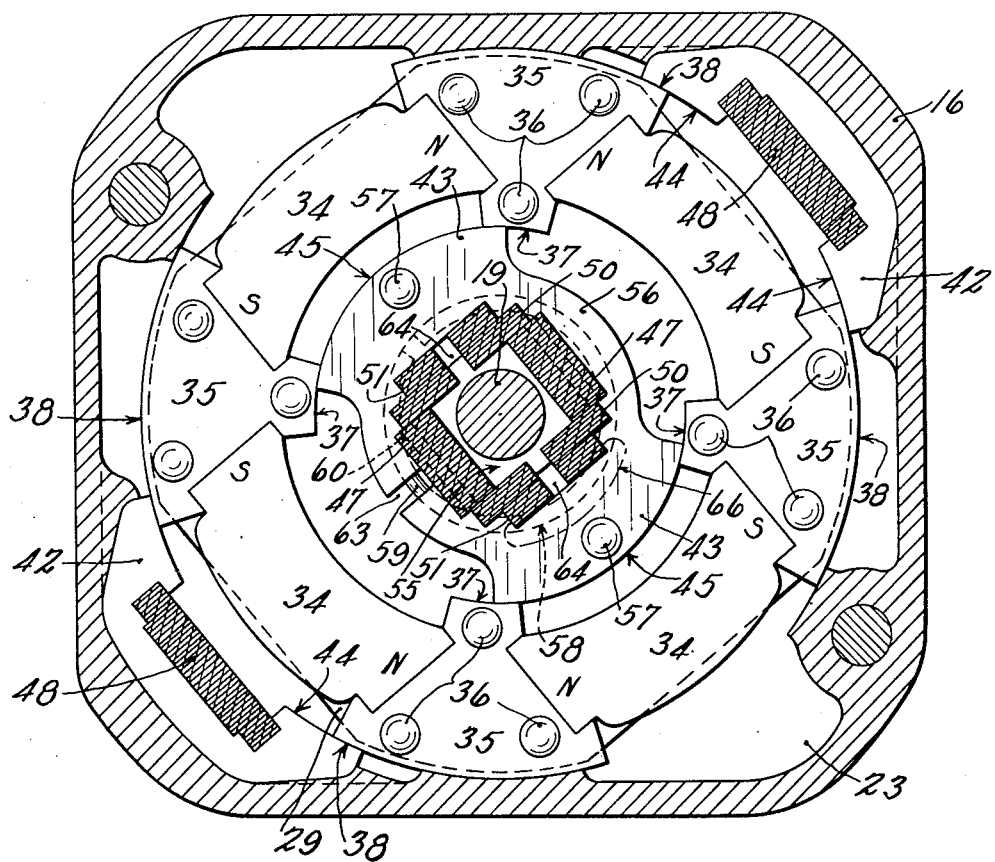
Fig. 4 is a sectional plan view taken on the line 4—4 of Fig. 3 showing the field element,—a magnetic rotor,—and the pole pieces of the armature.

The rotor comprises a plurality of permanent magnets 34, (Fig. 4) arranged one after another in a circular series coaxial with shaft 19, and laminated pole shoes 35. Each magnet 34, which is of short bar form, is received at its ends in recesses formed in the confronting ends of a pair of pole shoes 35. The pole shoes rest upon the supporting disc 29 and are suitably fixed thereto, as by the rivets 36. Each magnet is firmly held between a pair of pole shoes in close contact therewith. Each pole shoe has inner and outer part cylindrical surfaces 37 and 38, located coaxially of shaft 19 and adapted to cooperate with suitable pole pieces on the armature of the magneto. The arrangement affords a circular series of four pole shoes of alternating polarity. While four magnets are shown, this number is not essential for all purposes. Two diametrically opposite magnets might be omitted as shown in said application without effecting any change in functioning of the rotor,—the only change being a decrease in the amount of magneto motive force available.

The stator of the magneto includes the armature structure. Such structure includes primary and secondary coils 40 and 41, respectively, and members for conducting flux from the aforesaid magnets through the coils first in one and then in an opposite direction, whereby large changes in flux, due to the reversals in direction of flux flow, are effected through said coils. These flux-conducting members afford a magnetic path extending axially upward through the coils, thence radially outward across the upper end face of the coils and thence downwardly outside the coils. The lower and terminal ends of these members carry laminated pole pieces for cooperation with the pole shoes of the rotor. There are, as shown, a pair of outer pole pieces 42 and a pair of inner pole pieces 43, the units of each pair being diametrically opposed and the two pairs being spaced one from another ninety degrees. The pole pieces 42 have part-cylindrical, concave surfaces 44 for cooperation with the convex outer surfaces 38 of the pole shoes 35. The pole pieces 43 have part-cylindrical, convex surfaces 45 for cooperation with the concave inner surfaces 37 of pole shoes 35. The surfaces 44 and 45, like the surfaces 38 and 37 with which they respectively cooperate, are coaxial with shaft 19 and each pair of cooperating surfaces are located in exceedingly close proximity,—being separated only by a very small clearance.

Referring to Fig. 3, there are two flux-conducting members, each designated as an entirety by reference numeral 46. Each member is of substantially the shape of an inverted U and has inner and outer legs 47 and 48, respectively, the upper ends of which are joined by a cross-connecting portion 49. The two inner legs 47 pass axially through coils 40 and 41, while the two outer legs 48 are disposed outside the coils but parallel to the axis thereof and the cross-connecting portions 49 are disposed radially of the coils and extend across the upper end face thereof. Each member 46 is made up of a plurality of iron laminations, each of which is a one-piece punching 46' of the form shown in Fig. 5. The two U-shaped members 46 are bound together into one unit by W-shaped laminations some of which are constructed as shown at 50 in Fig. 6 and the rest of which are constructed as shown at 51 in Fig. 7. A plurality of laminations 46' are assembled into a group to form one member 46. A second similar group is assembled to form a second member 46. These two members are then laid side by side in the relative positions indicated by the two laminations 46' in Fig. 5. Then two W-shaped members, each comprising a suitable number of the laminations 50, are placed one on each side of the members 46 so that the central part 52 of the laminations 50 bridges across the inner legs 47 of the two members 46. Then, two more W-shaped members, each comprising a suitable number of the laminations 51, are placed one on each side of the first set of W-shaped members. The assembly of laminations then appears as shown in perspective in Fig. 8.

All the laminations of said assembly are clamped together and then fastened in any suitable way. As an example of one suitable way, the laminations may be held together by brazing applied transversely of the laminations to bind them one to another. For example, the brazing may be applied locally in strips one across the central part of the upper face of each cross-connecting portion 49 and across the corresponding portions of the laminations 50 and 51 and one across each outer leg 48 near the central part thereof. Each inner leg, however, is preferably brazed along its entire inner surface. In addition, the tops of the central upstanding portions of the W-shaped laminations are brazed across. The groups of W-shaped laminations are fastened to the inner legs 47 by brazing. The pole pieces 42 made up of a stack of laminations 42', such as is shown in Fig. 9, are forced onto the free ends of the outer legs 48 and squeezed together and, while thus squeezed, the outer ends of the legs are brazed across and brazed to the pole pieces to hold the latter in place.

The laminations 46', 50 and 51 each have a shoulder 53', on the outer face of each outer leg whereby to form the shoulders 53 shown in Fig. 8. The laminations 51 also have shoulders 54' located at the same level as shoulders 53', whereby to form the laterally-spaced shoulders 54 shown in Fig. 8. Each pole piece 42 seats against the long outer shoulder 53 and the two short inner shoulders 54 and is held against said shoulders by the fastening means, above described, or by any other suitable means.

The assembly of laminations, constructed as described, is placed in the mold in which the casting 16 is formed and embedded in the casting during the process of forming it. The outer legs 48, together with the corresponding parts of the laminations 50 and 51 and the pole pieces 42, are fixed in the peripheral wall of casting 16 at diametrically opposite points. The cross connecting portions 49 of both U-shaped members together with the corresponding parts of the laminations 50 and 51 are held in the top wall 24 of the inverted cup-shaped casting 16. The inner legs 47 are held in place by reason of their integral connection, one to each of the cross connecting portions 49, and they are securely tied together on opposite sides by the two members 52, supplemented by the corresponding parts of the two groups of laminations 51. A composite core of box-like formation is provided through which the core the driving shaft extends. This core has great strength and rigidity because the laminations of which it is composed are firmly bound together and because the two legs 47 are tied together by the members 52 and made like one unit. The individually flexible laminations are effectively held from flexing and a stiff core is provided which is securely braced by the anchored outer leg portions and horizontal cross-connecting portions of the laminations 50 and 51. Such portions, although shown as embedded in the walls of casting 16, may be fastened thereto in any other suitable way. The core which has to be supported cantilever fashion wholly from one end must be made rigid and must be firmly braced against substantial deflection under the strong magnetic pull applied at the other end of the core and at a substantial distance from the fixed end thereof.

The square hole 55 provided through the composite, box-like core, is machined out at its upper end into cylindrical form to receive the upper bearing 20.

The inner pole pieces 43 are both formed as integral radial projections from the central hub of a laminated member 56. The laminations of this member are held together in any suitable way, as by rivets 57. The hub 56 has a hole therethrough (Fig. 4) of a shape to fit the lower end of the composite box-like core. In the lower face of the hub (Figs. 3 and 4) is a cylindrical recess 58 to receive a split ring 59. Each of the inner legs 47 has a groove 60 (Fig. 3) in its lower end to receive the ring 59. The coils 41 and 42 are first put in place on the core, after which a washer 61 of cork or other resilient material is placed on the core and followed by the inner pole piece member. The latter is pushed upwardly, compressing the washer 61, until the groove 60 is exposed. The ring 59 is then engaged in such groove, after which the pole piece member is allowed to move downwardly until it engages and confines the ring 59 in recess 58. The ring then holds the pole piece member and coils 41 and 42 in place between it and the members 49.

The hub 56 of the inner pole piece member has a slot 63 (Fig. 4) to avoid the eddy currents that would otherwise be produced in each lamination of this member if it was in the form of a continuous ring. The bridging of the gap afforded by slot 63 by one of the legs 47 does not destroy the effect of the gap because current cannot effectively flow through the laminations from one to another.

The lower portion of the central leg of each W-shaped lamination 50 and 51 is provided with a slot 64. All of the slots 64 are in alignment, as will be clear from Fig. 4. These slots are provided to break up circuits which would otherwise be formed through the laminations 50 and 51 and the laminations of which the inner pole piece member 56 is composed and through which circuits eddy currents could flow. Considering Fig. 4, except for the slots 64, current might flow transversely through each lamination 50 and 51 from one side to another and, since the side edges of the laminations 50 and 51 are each in contact with a side edge of each of the laminations of the pole piece member 56, each of the last-named members would serve to complete a circuit from one side edge of each lamination 50 or 51 to the opposite side edge thereof. The dot-dash line 66 in Fig. 4 indicates diagrammatically the course of one circuit such as described.

It will be noted that the laminations 42' of the outer pole pieces are so formed as to avoid a loop circuit in which eddy currents might be formed.

The slots 64 also serve to split the end of the core on which the pole piece member 56 is pressed and enable a tight, friction fit of the member on the core.

In operation, the magnetic rotor, as it turns, establishes magnetic circuits through the armature first in one and then in an opposite direction, thereby creating by the successive reversals of flux flow large flux changes to generate in coil 41 high E. M. F.'s to produce effective sparks for ignition purposes. The structure shown produces four sparks per revolution of the rotor. There are two North and two South pole shoes 35 on the rotor. When the two pole shoes of North polarity overlap the two pole pieces 42, the two shoes of South polarity overlap the two pole pieces 43. Accordingly, flux from all four magnets 34 flows up through the outer legs 48 of the armature, radially inward through the cross bar 49 and thence axially downward through the composite box-like core 47—51—52. When the rotor turns ninety degrees from this position, the pole shoes of North polarity will overlap the inner pole pieces 43 and the pole shoes of South polarity will overlap the outer pole pieces 42. Flux from the magnets will then flow axially upward through the composite core, then radially outward through the cross bar 49 and thence downward through the outer legs 48. Four times during each revolution a magnetic circuit through the coils is broken and a reverse circuit established and each of these reversals is or may be utilized in the well known way, and as explained in the above identified application, to effect the production of a spark.

The present invention is particularly directed to the construction and mounting of the magnetic elements of the armature. The generally W-shaped magnetic structure provides for a central core, rigidly united to a cross bar having a pair of outer legs, one at each end thereof. These outer legs, and preferably also the cross bar, are capable of being easily, firmly, and inexpensively secured to the marginal and end wall respectively, of housing 16. These parts may be fixed by embedding them in the casting during the process of its formation or by any other suitable means. However they may be fixed, these outer legs afford secure anchorages, supplemented by the diametrical cross bar, for the core which of necessity has to be supported from one end only. When made of laminations, as specifically disclosed herein, the two U-shaped groups are effectively tied together and braced. The two inner legs 47, while integral with the cross bars 49 and outer legs of their own laminations, would nevertheless be free to flex under the powerful magnetic pull of the rotor. However, by uniting these legs by the central legs of the laminations 51, 52, the two legs 47 are tied together into a box-like structure, whereby the core is made rigid and able to effectively resist the magnetic pull exerted thereon by the rotor. For the best results, the parts, which thus tie the legs 47 together, are made as shown in W-form so as to have outer legs and cross bars which can be embedded or otherwise secured to the walls of the housing along with the corresponding portions of the U-shaped members.

The invention thus affords a materially improved magnetic structure for the armature of a magnet or other form of dynamoelectric machine. By the use of the invention, substantial savings in cost are effected and a better and more rigid structure is provided.

What I claim is:

1. A stator structure for a dynamoelectric machine, comprising, a coil, a flux conducting member; said member having a core extending axially through the coil, a cross bar portion extending in opposite directions from one end of said core and located adjacent one end of said coil, and a pair of legs extending one from each end of said portion and terminating with diametrically opposed pole pieces having part-cylindrical surfaces located coaxially of said coil and near the other end of said coil; and pole pieces carried by the other end of said core and having part-cylindrical surfaces located coaxially of said coil; said core, portion and legs being rigidly united into one self-sustaining unit to maintain the pole pieces on the core and those on said legs in true coaxial relation.

2. A stator structure for a dynamoelectric machine, comprising, a coil, a pair of substantially U-shaped flux-conducting members each made up of laminations and including inner and outer legs and a cross-connecting portion at one end of said legs all rigidly held together as one piece, said members being disposed in diametrically-opposed relation with respect to the axis of said coil with all the inner legs passing through the coil and all the outer legs located outside the coil, a housing for said coil and members, said housing being constructed of non-magnetic material and having an end wall adjacent one end of the coil and a marginal wall encompassing the coil, said outer legs being rigidly fixed to said marginal wall at opposite locations thereon, laminated members interconnecting said inner legs on opposite sides thereof and forming therewith a composite box-like core, said members being rigidly connected to said inner legs and bracing them into one rigid unit and binding them together, and pole-piece means carried by the free ends of the inner and by the free ends of the outer legs.

3. A stator structure for a dynamoelectric machine, comprising, a coil, a pair of substantially U-shaped flux-conducting members each made up of laminations and including inner and outer legs and a cross-connecting portion at one end of said legs all rigidly held together as one piece, said members being disposed in diametrically-opposed relation with respect to the axis of said coil with all the inner legs passing through the coil and all the outer legs located outside the coil, a housing for said coil and members, said housing being constructed of non-magnetic material and having an end wall adjacent one end of the coil and a marginal wall encompassing the coil, said outer legs being rigidly fixed to said marginal wall at opposite locations thereon and said cross-connecting portions being rigidly fixed to said end wall, laminated members interconnecting said inner legs on opposite sides thereof and forming therewith a composite box-like core, said members being rigidly connected to said inner legs and bracing them into one rigid unit and binding them together, and pole-piece means carried by the free ends of the inner and by the free ends of the outer legs.

4. A stator structure for a dynamoelectric machine, comprising, two laminated flux-conducting and substantially U-shaped members each having an inner and an outer leg and a cross-bar portion connecting the inner and outer legs at one end, said members being disposed with their inner legs in confronting and spaced parallel relation and with the two cross-bar portions located at the same end, and two laminated and substantially W-shaped members each having two outer legs and an intermediate leg all in substantially parallel relation and joined by a cross bar portion, said W-shaped members being fixed to and uniting said pair of U-shaped members on opposite sides thereof with the center legs of the W-shaped members interconnecting the two inner legs of the U-shaped members one on each side thereof and forming therewith a composite hollow box-like core, the outer legs and the cross-bar portions of the W-shaped members being fixed respectively to the outer legs and cross-bar portions of the U-shaped members.

5. A stator structure for a dynamoelectric machine, comprising, two laminated flux-conducting and substantially U-shaped members each having an inner and an outer leg and a cross-bar portion connecting the inner and outer legs at one end, said members being disposed with their inner legs in confronting and spaced parallel relation and with the two cross-bar portions located at the same end, and two laminated and substantially W-shaped members each having two outer legs and an intermediate leg all in substantially parallel relation and joined by a cross-bar portion, said W-shaped members being fixed to and uniting said pair of U-shaped members on opposite sides thereof with the center legs of the W-shaped members interconnecting the two inner legs of the U-shaped members one on each side thereof and forming therewith a composite hollow box-like core, the outer legs and the cross-bar portions of the W-shaped members being fixed respectively to the outer legs and cross-bar portions of the U-shaped members, and a housing of non-magnetic material having an end wall to which said cross-bar portions are fixed and a marginal wall to which said outer legs are fixed on opposite sides of said core.

6. A stator structure for a dynamoelectric machine, comprising, two laminated flux-conducting and substantially U-shaped members each having an inner and an outer leg and a cross-bar portion connecting one end of the inner leg to one end of the outer leg, said members disposed with their inner legs in confronting and spaced parallel relation, and a laminated and substantially W-shaped member having its outer legs fixed one to each outer leg of the said U-shaped members and its intermediate leg being fixed to both said inner legs and spanning the space between them to brace them and rigidly bind them together into a unitary structure, and a non-magnetic housing in which said outer legs are fixed at opposite locations with the cross-bar portions spanning across the housing and supporting the united inner legs as a core in cantilever fashion.

7. A stator structure for a dynamoelectric machine, comprising, a housing of non-magnetic material having an end wall and a marginal wall extending therefrom, a coil located within the housing, a flux conducting member having a part extending diametrically of said coil and rigidly fixed to said end wall and extensions from the ends of said part, said extensions being rigidly fixed to said marginal wall one on each side of said coil, pole pieces fixed one to the free end of each of said extensions and provided with concave surfaces coaxially disposed with reference to said coil, and a box-like core extending through said coil, said core being rigidly united at one end to said part and supported in cantilever fashion from and solely by said part, and pole pieces provided on the other end of said core and having convex surfaces also located coaxially with respect to said coil.

KENNETH A. HARMON.